Patented July 23, 1935

2,008,746

UNITED STATES PATENT OFFICE 2,008,746

COATING COMPOSITION AND METHOD OF MAKING SAME

Arnold Miller Collins, Wilmington, Del., assignor to E. I. du Pont de Nemours & Company, Wilmington, Del., a corporation of Delaware No Drawing. Application June 2, 1931, Serial No. 541,659

10 Claims. (Cl. 134—26)

This invention relates to the art of coating and more specifically pertains to novel coating compositions having new and useful properties.

This application is in part a continuation of an application of A. M. Collins, Serial No. 384,239, filed August 7, 1929.

Prior art

It is known that acetylene will polymerize in the presence of a catalyst comprising an aqueous solution of ammonium or tertiary amine salt and cuprous salt to yield polymerizable non-benzenoid compounds, this process being described in an application of J. A. Nieuwland, Ser. No. 305,866, filed September 13, 1928, Patent No. 1,811,959. These acetylene polymers correspond to the empirical formulæ, $C_4H_4$, $C_6H_6$, and $C_8H_8$. The dimer, $C_4H_4$, includes the compound identified as monovinylacetylene, and the trimer, $C_6H_6$, includes the compound identified as divinylacetylene. It is further known that these non-benzenoid polymers of acetylene readily polymerize to give compounds of high molecular weight varying from viscous liquids to resinous solids, this subject matter forming the basis of an application of J. A. Nieuwland, Ser. No. 330,415, filed January 4, 1929, Patent No. 1,812,541.

It has been disclosed in an application of A. M. Collins, Ser. No. 384,238, filed August 7, 1929, Patent No. 1,812,849, that the non-benzenoid polymers of acetylene may be polymerized to form liquid products having the general properties of drying oils, but possessing many advantages over the drying oils heretofore known to the art, and the adaptation of these novel drying oils as superior coating compositions has been described in an application of A. M. Collins, Ser. No. 384,239, filed August 7, 1929, Patent No. 1,812,544. Where the use of divinylacetylene and a tetramer of acetylene, and reduction products of acetylene polymers is disclosed, it will be understood that other unsaturated hydrocarbons, such as other polymerizable polymers of acetylene and other partial reduction products containing at least two and preferable three unsaturated bonds, or the homologs or isomers of these compounds, may be used. Thus, compounds such as butadiene, dimethyl butadiene, isoprene, piperylene, dipropargyl, hexatriene, or other aliphatic hydrocarbons containing at least two unsaturated bonds, and capable of being polymerized to liquid, non-volatile polymers, may be used. Furthermore, it is not necessary to use pure compounds in making the synthetic drying oils, and in fact it is sometimes advantageous to polymerize mixtures of unsaturated hydrocarbons of the type described. Thus, as indicated in Example VII, of Patent No. 1,812,849, divinylacetylene may be first partially hydrogenated to a mixture containing such compounds as divinylacetylene, vinyl ethyl acetylene, and vinyl ethyl ethylene, the mixture then being polymerized.

Film-forming materials of the type above described will be termed "synthetic drying oils" throughout the specification and claims.

Objects of invention

In accordance with the present invention, it has been discovered that all types of pigments may be successfully incorporated into the synthetic drying oils disclosed in the Collins applications above identified, yielding a wide variety of coating compositions which are useful for much more varied purposes than are the unpigmented synthetic drying oil compositions.

An object of the invention therefore relates to the incorporation of pigments into compositions containing synthetic drying oils, with the production of novel coating compositions of a highly useful character.

Other objects and features of the invention will become apparent from the following detailed description of the invention, and from the claims.

Description of invention

The incorporation of pigments into synthetic drying oils results in the formation of various types of coating compositions, dependent upon the particular pigments used, the relative proportions of pigment to drying oil, the amount of solvent, thinner, or the like, in the final coating compositions and upon other variables. Thus, by the incorporations of pigments in relatively small amounts, decorative enamels suitable for finishing automobiles, furniture, and other metal or wooden surfaces have been prepared. These enamels possess a rapidity of drying and a gloss and hardness which are characteristic of the synthetic drying oil itself.

The following examples are illustrative of the preparation of decorative coatings in accordance with the teachings of the invention.

Example I

*Dark green enamel.*—One hundred and seventy-seven grams of bone black, 46 grams of chrome green, and 13 grams of chrome orange are ground in a ball mill with steel balls with 200 grams of toluene and 740 grams of a 98% solution of the synthetic drying oil made as described below. The air in the mill is replaced by carbon dioxide to prevent oxidation of the synthetic drying oil. After grinding for three days the resulting paste is thinned by the addition of 426 grams of toluene and 100 grams of a solution in mineral spirits of mixed lead and manganese driers. The synthetic drying oil used in this example is prepared according to a slight modification of Example VI of Patent No. 1,812,849 by refluxing crude divinylacetylene containing 25% of a tetramer of acetylene for 6.5 hours at atmospheric pressure in a vessel from which the air is displaced by nitrogen. The principal part of the unchanged divinylacetylene is then removed by vacuum distillation. Toluene is then added and the distillation is continued until all of the unchanged divinylacetylene and nearly all of the toluene are removed. The enamel prepared as described above, when applied by spraying to sheet metal carrying a system of undercoats such as is commonly used in the finishing of automobile bodies, is tack-free in one hour and in four hours is perfectly hard and forms a lustrous, dark green, highly resistant finish.

Example II

*Black enamel.*—One hundred and thirty-six grams of carbon black are ground for 24 hours in a ball mill as described in Example I with 864 grams of a 95% solution of the synthetic drying oil in xylene prepared by the method used for preparing the synthetic drying oil used in Example I except that xylene is substituted for toluene. The thick dispersion of carbon black resulting is then converted into an enamel by the addition of 911 grams of the concentrated synthetic drying oil solution, 463 grams of solvent naphtha, and 3 grams of eugenol. It dries in thick coats to a very hard, black, lustrous finish in 12 hours.

Example III

*Orange enamel.*—One hundred grams of chrome orange pigment are ground as in Example I for two days with 100 grams of a 25% solution of a synthetic drying oil. This is made by refluxing 1000 parts by weight divinylacetylene, from which substantially all of the acetylene tetramer has been removed by fractional distillation, with 10 parts of diethyl amine, 10 parts of dibutyl amine and 1000 parts of xylene until approximately one-half of the divinylacetylene is polymerized, the distillation being controlled to effect substantially complete removal of unchanged divinylacetylene. The orange paste prepared above is mixed with 516 grams of the synthetic drying oil solution and 36 grams of a 40% solution of meta styrene in toluene. This orange enamel gives a hard, glossy film in 18 hours and adheres more firmly to smooth metal surfaces than a similar enamel containing no meta styrene.

Example IV

*White enamel.*—Ninety grams of a 45% solution in xylene of the polymers obtained by treating a mixture of hydrocarbons obtained by hydrogenating one mol of divinylacetylene with 2 mols of hydrogen as described in Example VII of Patent No. 1,812,849 are ground in a ball mill with 50 grams of zinc oxide. Ten grams of xylene are then added to reduce the viscosity of the composition to a point suitable for application by brushing. The resulting enamel gives a hard, glossy finish which is tack-free in two hours and whose whiteness is not affected by long exposure to sunlight.

Example V

*Aluminum lacquer.*—Fifty grams of aluminum powder are stirred into 350 grams of a 71% solution of synthetic drying oil in xylene prepared as in Example II. The freshly prepared lacquer applied by either brushing or spraying gives a hard, resistant finish with a bright silver luster. It dries in about two hours.

Example VI

*A dark green enamel with clear top coat.*—To a suitably prepared undercoat surface, one coat of the dark green enamel of Example I is applied by spraying. When the film is somewhat dry but not tack-free (about ½ hour) a coat of clear lacquer is applied which is prepared by mixing 60 grams of a 90% solution in xylene of a synthetic drying oil prepared as described in Example II and 10 grams of the metallic drier solution used in Example I. The resulting dark green finish is hard in four hours, has resistance to chalking on long outdoor exposure, greater than that which would result if the outer coating of clear lacquer were not applied over the enamel.

In the preparation of decorative enamels from the synthetic drying oils described, the absence of chemical activity in the synthetic drying oil makes it possible to use any of the pigments or combinations of pigments commonly used in the manufacture of enamels and lacquers, including basic pigments, such as zinc oxide, which cannot be used in many of the acidic synthetic resin vehicles, and lead pigments, which must be avoided in the case of nitrocellulose lacquers. Thus I may use as pigments in the decorative enamels, zinc oxide, lithopone, Titanox, titanium dioxide, white lead, chrome orange, chrome yellow, para toner red, Prussian blue, chrome green, aluminum powder, aluminum bronze, carbon black and bone black.

As the vehicle for decorative enamel, I may use, preferably after dilution with the solvents described below, any of the liquid, non-volatile polymerizable polymers of unsaturated aliphatic hydrocarbons containing at least two unsaturated bonds. Preferred compounds and materials of this type are described in Examples I to VII of Patent No. 1,812,849 and in the brief discussion on page 1 relative to the hydrocarbon materials suitable for use in the preparation of synthetic drying oils. I may also modify the properties of the polymers as in Example III by the incorporation either before or after the grinding operation of synthetic resins such as meta styrene, natural gums such as rosin, natural oils such as linseed oil and castor oil, and softeners such as dibutyl phthalate. The ratio of pigment to vehicle in these enamels may be greatly varied, the only limitation, in general, being that the proportion of pigment should be high enough to give the desired hiding power but not so high as to give a film with less than the desired degree of gloss. The pigments may be dispersed and incorporated by grinding by any of the methods known to the art, or, as in the case of aluminum above, may be incorporated simply by stirring. It is desirable to protect the synthetic drying oil from premature atmospheric oxidation by carrying out all steps of the manufacture of the enamels in closed vessels containing an inert gas such as carbon dioxide or nitrogen. In certain cases the enamels show a tendency to wrinkle on drying. This may be avoided by the addition of metallic driers as in Example I or by the addition of volatile antioxidants as in Example II. Metallic driers also accelerate drying to the tack-free stage, while volatile antioxidants somewhat retard both drying and hardening. The latter also tend to prevent the skinning of the enamel in the container. In cases where an antioxidant is present during the polymerization of the unsaturated hydrocarbons, as in the case with the vehicle used in Example III, the further addition of antioxidant to the finished enamel is usually unnecessary. The enamels may be reduced to viscosities suitable for application by spraying, brushing, etc., by the addition of solvents, preferably aromatic hydrocarbons such as toluene, solvent naphtha, or xylene. Esters such as butyl acetate and mixtures of aromatic with aliphatic hydrocarbons may also be used.

The synthetic drying oil enamels may be applied directly to wood, metal, or other surfaces, but in general, it is preferred to prepare the surface, as is done in the finishing of automobiles, furniture, etc., by the application of one or more coats of an undercoat material which is sanded smooth by the usual methods before the application of enamel. As undercoat, I may use either the undercoats now in use, which are generally highly pigmented compositions with either varnish bases or synthetic resin solutions as vehicles, or I may use an undercoat containing a synthetic drying oil, as described hereinafter in Examples VII and VIII, or a combination of these two types of undercoat.

To the surfaces described in the preceding paragraph, one or more coats of the synthetic drying oil enamel may be applied, two coats, or in many cases one coat, being sufficient to give a film of sufficient thickness for practical purposes. As in Example VI, the resistance of the system to "chalking" or "blooming" on outdoor exposure may be greatly increased by the application of a top coat of the unpigmented synthetic drying oil. In such cases, one coat of the enamel is ordinarily sufficient. In either case a better bond between the successive coats of the synthetic drying oil products may be obtained by applying the second coat before the first is thoroughly dry. The synthetic drying oil products may be applied by any of the methods used for the application of enamels such as spraying, brushing, dipping, or flowing. The viscosity suitable for each method of application may be obtained by thinning with solvents, as already described.

The decorative enamels containing synthetic drying oils as described above, even when reduced to the low viscosity necessary for application by spraying, contain from 2–5 times the weight of film-forming ingredients present in the ordinary nitrocellulose lacquers. Hence, one or two coats of the new product gives a finish as thick as is now obtained by the use of four or six coats of the present nitrocellulose products. In further contrast with nitrocellulose lacquers, the synthetic drying oil products remain fluid for a relatively long time after application and, therefore, allow irregularities in the film formed during its application, (the so-called "orange peel" formed by spray application) to disappear, giving a smooth, mirror-like glossy surface, which may be used for most decorative purposes without any polishing. An even higher gloss may be obtained, however, by polishing with very fine abrasives such as are used in the final polishing of nitrocellulose lacquer films. Although the first portion of the drying period is slow, allowing the formation of a perfectly smooth surface, the latter portion of the drying period during which the film hardens, is fairly rapid. As a result, the time required for the formation of a hard surface approximates in many cases the time required for the thorough hardening of nitrocellulose lacquers. The synthetic drying oil enamels, therefore, combine to a large extent the desirable features of nitrocellulose lacquers such as rapid hardening and durability with the desirable properties of oil enamels such as high natural gloss and high solids content. Furthermore, the synthetic drying oil films surpass even the nitrocellulose lacquers in hardness, resistance to marring and absence of softening tendency at elevated temperature, and, in addition, unlike all common organic film-forming materials, are extremely resistant to the action of water, organic solvents, and, except where the pigments or other added ingredients are themselves reactive, are very resistant to the action of acids, alkalies, and other corrosive substances. The synthetic drying oil enamels may be used for any purposes for which varnishes and nitrocellulose lacquers are now used, such as the finishing and decoration of wood and metal surfaces of automobiles, furniture, machinery, toys, and the like. In addition, the synthetic drying oil enamels, because of their unusual resistance to the action of water, solvents, and corrosive chemicals, may be used where the present lacquers and enamels would be rapidly attacked and destroyed.

It has been found that the incorporation of pigments in many cases overcomes a peculiar, and in some cases, an undesirable property which is exhibited by unpigmented synthetic drying oil films, and more particularly by the films formed from synthetic drying oils prepared from divinyl-acetylene and the tetramer of acetylene. This property consists of a tendency for the clear films, although they adhere firmly to smooth metallic and other surfaces under normal conditions, to detach themselves completely if subjected to a great drop in temperature, for example, if heated to 100° C. and then suddenly cooled to room temperature by means of a rapid current of cold air. This characteristic is not of any serious consequence in the case of decorative enamels, since they are not ordinarily subjected to sudden and extreme changes of temperature, and are moreover usually applied over suitable undercoats which afford good adhesion under all conditions. However, this characteristic is highly undesirable in the case of undercoats and in protective coverings which are directly applied to metal, wood or other surfaces and which are subject to sudden temperature changes combined with bending, abrasion, and like stresses. The incorporation of pigments in suitable proportions and of a suitable character into synthetic drying oils effects a substantial reduction in and may even eliminate this tendency. The use of pigments in this fashion also decreases the tendency of the dry films to blister under severe conditions, and increases the protection afforded by the film against corrosive agents.

Pigments may be introduced into synthetic drying oils in proportions greater than the proportions used in making up decorative enamels of the character illustrated in Examples I to VI to give other useful products. Dependent upon the type of pigment used and the proportion of pigment to synthetic drying oil, there may be obtained undercoats for paints, varnishes, lacquers, and the like, putties, and a great variety of protective coatings resistant to the action of water, organic solvents, strong acids and alkalies, and other corrosive agents. The pigments used in these latter types of coating materials are usually, although not necessarily, of a different character than the pigments used in decorative coatings, the latter named pigments being chosen principally on the basis of color and appearance, rather than to reduce the tendency of the dry films to become loose.

Examples serving to illustrate the mode of preparation of pigmented coatings for use other than as decorative enamels are as follows, (i. e., as undercoats and protective finishes):

Example VII

*Undercoat for lacquers and enamels.*—A mixture of 135 grams of iron oxide, 163 grams of whiting, 93 grams of barytes, and 5 grams of carbon black is ground for three hours in a ball mill from which the air has been displaced by carbon dioxide with 116 grams of an 85% solution of synthetic drying oil used in Example II and 80 grams of solvent naphtha. Three coats of this composition applied in rapid succession to metal are dry and hard in 24 hours at room temperature or in one hour at 160° F. The resulting film is very hard, is not softened by water, and, after sanding, gives a smooth surface for the application of the finishing coats which may be either nitrocellulose or other common enamels, or the decorative synthetic drying oil enamels described above. This undercoat also adheres well to the metal over which it is applied, even when subjected to sudden changes of temperature.

Example VIII

*Undercoat for lacquer and enamels.*—Six hundred grams of finely powdered slate, 161 grams of a 93% solution of synthetic drying oil similar to that described in Example II, and 176 grams of solvent naphtha are ground over night in a ball mill with steel balls. This paste, when thinned with 63 grams of solvent naphtha, gives a composition of viscosity suitable for brushing. One thick coat applied over wood becomes dry and hard after 16 hours' drying at the ordinary temperature and may be sanded to a smooth, gray, slate-like surface. The application of the black enamel of Example II to this undercoat gives a system of great durability under the conditions of varying temperature and humidity met with in houses.

Example IX

*Filler for rough metal.*—Six hundred grams of china clay, 177 grams of an 85% solution of a synthetic drying oil, similar to that used in Example II, and 161 grams of solvent naphtha are ground together in the usual manner. This putty-like product may be applied with a knife to rough surfaces such as castings and dries in 4 to 6 hours to a coating which completely fills the irregularities of the metal and may be sanded to a smooth surface. This may serve as a basis for the application of a finishing coat or coats of nitrocellulose or synthetic drying oil lacquers.

Example X

*Marine paint.*—Five hundred and forty grams of basic lead chromate, 60 grams of basic zinc chromate, and 120 grams of asbestine are ground in the usual manner with 212 grams of an 85% synthetic drying oil solution, similar to that used in Example II, and 150 grams of solvent naphtha. This paint, when applied by brushing, is dry in one hour and hard in two hours, at which time it may be immersed in water without damage. Two coats of this composition applied to steel and immersed in tropical water protects the steel from corrosion for long periods and also reduces the collection of marine growths.

Example XI

*Acid-resistant and petroleum-resistant coating.*—Four hundred and twenty grams of amorphous silica are ground in the usual manner with 148 grams of a 95% solution of synthetic drying oil similar to that used in Example II, and 100 grams of solvent naphtha. The resulting composition dries in one hour or less to a hard, greenish-yellow coating, which adheres firmly even when subjected to sudden changes of temperature. It is unaffected by and protects metal against the action of strong acids such as nitric acid, and other highly corrosive substances such as liquid bromine, and is also unaffected by organic solvents such as petroleum hydrocarbons. For this reason, it is very effective as a petroleum-resistant paint, protecting steel which would otherwise be rapidly corroded by the influence of hydrogen sulfide and other sulfur compounds present in crude petroleum.

Example XII

*Acid-resistant and petroleum-resistant coating.*—Four hundred and eighty grams of amorphous silica and 160 grams of asbestine are ground in the usual manner with 182 grams of an 88% solution of the synthetic drying oil described in Example II, and 178 grams of solvent naphtha. The resulting paint is very similar to that described in the preceding example except that a tendency for the silica to settle during storage of the paint to a hard cake has been eliminated. Its rate of drying and hardening is essentially the same.

Example XIII

*Acid-resistant and petroleum-resistant coating.*—One coat of the composition described in Example XII is applied to the surface to be protected and is then covered with a clear lacquer, consisting of a 90% solution of a synthetic drying oil in xylene, such as that described in Example II, containing 0.1% of eugenol based on the weight of the oil. The resulting system has the general properties of those described in the preceding two examples but has a smooth surface and presents a better appearance.

Example XIV

Nine hundred and ten grams of natural flake graphite are ground in the usual manner with 418 grams of a 93% solution of a synthetic drying oil in xylene and 672 grams of solvent naphtha. After grinding, 700 grams of this base is mixed with 196 grams of the drying oil solution and 84 grams of solvent naphtha. The resulting composition dries hard in two hours or less and gives a dull black coating similar to those of the preceding three examples in its resistance to corrosive materials and its firm adhesion to metal surfaces under extreme conditions.

Example XV

*Acid-resistant and petroleum-resistant coat-*

*ing.*—Eight hundred grams of the graphite base prepared above is mixed with 93 grams of a synthetic drying oil solution, such as that described in Example II, and 39 grams of the solvent naphtha. The black coating formed from this composition is similar in drying characteristics and in general appearance to that of the above example. One coat of this applied to metal and then covered with a coat of unpigmented synthetic drying oil, such as used in Example XIII, gives a glossy, black coating of good appearance and essentially the same resistance as that of Example XIV. Instead of the synthetic drying oil, an aluminum lacquer made by stirring 15 parts of flake aluminum into 330 parts by weight of synthetic drying oil solution may be used to give a system with a silvery luster suitable for coating the interior of crude petroleum tanks.

*Example XVI*

*Light-colored acid-resistant coating.*—Fourteen hundred grams of Titanox are ground in the usual manner with 645 grams of a synthetic drying oil solution, such as that described in Example II, and 255 grams of solvent naphtha. This composition gives a cream-colored, glossy coating (drying time about two hours) of good resistance to acids and solvents and adhering well to metal surfaces under all but the most severe conditions. It may be used to advantage where a resistant coating of very light color and smooth, glossy surface is desired.

Preferred pigments hereafter called, for brevity, "fortifying" pigments, which render the films of the synethetic drying oil tightly adhering even when subjected to extreme and sudden temperature changes and, which therefore are suitable for use in synthetic drying oil undercoats and protective finishes, include many pigments commonly used in the undercoats and protective finishes now known to the art. Examples of such fortifying pigments are silica (either amorphous or crystalline), graphite, asbestine, barytes, whiting, china clay, powdered slate, red iron oxide, and the basic chromates of lead and zinc. The fortifying effect of pigments, however, varies considerably. Some pigments such as magnetic iron oxide, for example, which are useful generally in undercoats and protective finishes, have only a limited effect upon the tendency of synthetic drying oil films to scale off. Hence they are less desirable than more highly fortifying pigments, in cases where the films are subject to sudden temperature changes. They may be used, however, in conjunction with pigments having a more pronounced fortifying action. On the other hand, many pigments not commonly used in undercoats and protective finishes, such as Titanox, titanium dioxide, and lithopone, exhibit a marked fortifying action, and hence are particularly suitable for use in synthetic drying oil undercoats and protective finishes. The above fortifying pigments, in addition to their fortifying action, in general impart to the synthetic drying oil films other useful properties. Thus the basic chromates of zinc and lead used in Example X, through their inhibitive action upon the corrosion of iron by air and water, form with the synthetic drying oil coatings of good anti-corrosive properties. Similarly, the pigments used in Example VII impart good sanding properties to the synthetic drying oil undercoats. In most cases it is desirable that the pigments used should have a so-called fortifying action upon the synthetic drying oil, although this is not of great importance when the composition is to be used over undercoats of other film-forming materials, (for example, when used as a surfacer over an oil or resin type primer in building up an automobile undercoat system), over rough or porous surfaces such as brick or cement, or in the cases where it is certain not to be subjected to sudden extreme changes of temperature. In cases where the finish must have extreme resistance to highly corrosive chemicals, for example, nitric acid or bromine, reactive pigments such as iron oxide should be avoided. For such purposes, non-reactive pigments such as silica and graphite are preferred.

There exists for each pigment when used alone a definite ratio to the synthetic drying oil at which it exhibits its maximum fortifying action. This ratio for graphite is approximately 60 parts by weight of graphite to 40 parts of the synthetic drying oil, for asbestine 70:30, for silica 75:25, and for Titanox 80 parts to 20 parts of the synthetic drying oil. These ratios bear a general relationship to the oil absorption indices of the pigments, which for the above pigments are 61, 52, 36, and 22%, respectively. The term "oil absorption index" as here used is defined as the percentage by weight of the synthetic drying oil which must be added to the pigment to wet it completely with the formation of a paste of definite physical characteristics and is determined by the so-called spatula method which is completely described by Booge and Eastlack in the Paint, Oil, and Chemical Review vol. 77, No. 14, page 10 (May 7, 1924). It will be seen from the illustrative figures given above that the lower the oil absorption index of the pigment, the higher is the pigment-to-oil ratio for maximum fortifying action and that, as an approximation, the maximum fortifying action is obtained when the weight of synthetic drying oil used is approximately equal to the weight of pigment multiplied by the oil absorption index determined for the oil and pigment in question. The exact position of the maximum should, however, be determined by direct experiment for each new pigment. At this point of maximum fortifying action, other properties such as resistance to blistering are also at a maximum, and hence in general the most durable and serviceable coatings are obtained by the use of the corresponding ratio of pigment to synthetic drying oil. For certain purposes, however, it may be desirable to use other ratios, as, for instance in Example XVI, where somewhat less than the optimum amount of Titanox is used in order to obtain a smoother and more glossy surface. Unless the ratio corresponding to maximum fortifying action is departed from widely, the resulting composition will still have good adhesion when subjected to sudden changes of temperature.

Other features of the formulation and manufacture of the synthetic drying oil undercoats and protective finishes are for the most part similar to those already described for the decorative enamels. Thus, as vehicle, I may use any of the film-forming hydrocarbon polymers or mixtures of these with other film-forming materials as already described in connection with the decorative enamels, and may likewise use as solvents and thinners any of the materials described there for that purpose. However, when an extremely resistant coating is desired, it is best to omit the resins, softeners, and natural oils from the vehicle, which in this case should preferably consist of polymers of divinylacetylene or of a tetramer of acetylene.

The use of pigments in synthetic drying oil compositions reduces and even eliminates the tendency exhibited by some synthetic drying oil films, and particularly those prepared from drying oils derived from divinylacetylene and a tetramer of acetylene, to wrinkle on drying. This tendency may be overcome by the use of driers and/or volatile anti-oxidants, but the necessity of using such agents is practically eliminated where the films are highly pigmented, as in synthetic drying oil undercoats and protective finishes of the character described in connection with Examples VII to XV.

Although the tendency of synthetic drying oils, particularly those prepared from divinylacetylene and a tetramer of acetylene, to wrinkle during drying, is an undersirable characteristic in the use of these materials in coating compositions, it may be made use of in the production of wrinkled decorative finishes, and in the art of photoengraving.

A synthetic drying oil, preferably of the character described in Examples I, III, IV and VI of Patent No. 1,812,849, in the form of a wet film and containing little or no antioxidant or drier, is exposed to a source of light such as sunlight, ultraviolet light or in some cases, ordinary diffused daylight, and permitted to dry. The dried film presents a continuously wrinkled surface, the design and effect of which are influenced by the rate of drying. For example small amounts of antioxidants and/or driers may be added to the synthetic drying oils to control the character of wrinkles produced. The wrinkling effect may also be influenced by the presence of small amounts of pigments. The fineness of the wrinkles may readily be controlled by varying the intensity of the light or the thickness of the film. Further, since the wrinkling depends upon the intensity of the light, novel effects may be obtained by allowing films of the synthetic drying oil to dry under light projected upon them in patterns produced by transmitting the light through stencils, screens, transparencies, and the like. The designs produced may furthermore consist of wrinkled patterns upon a smooth background or vice versa, dependent upon which portions of the film are exposed to the illumination. Elaborate effects of the same general character may be found by exposing the wet films through screens having varying degrees of opacity, e. g., photographic positives or negatives, and in these cases, the design or picture is reproduced with the varying degrees of light and shade represented by fineness of the wrinkles of the dried film.

The wrinkled decorative finishes described dry rapidly without the necessity for a baking treatment, and form hard finishes having an exceptional resistance to water, solvents, and corrosive materials.

The synthetic drying oils are likewise suitable for use in photoetching and photoengraving processes, the drying oil being applied over the surface of a metal such as zinc and then exposed to light transmitted through a stencil or screen for a time long enough to allow the drying of the exposed but not the unexposed portions. The differentially dried film is then treated with a solvent such as toluene to dissolve the unhardened portion of the film, corresponding to the opaque portion of the stencil or screen. The metal is then etched, for example, with an acid such as nitric acid, the etching agent acting only on the portions of the metal surface which were not exposed to light, the exposed portions being protected by a resistant film of the synthetic drying oil. Hence an etching may be produced which represents accurately the image photographed.

It will be understood that the drying oils, the wrinkling effect of which is utilized in the above processes, may contain pigments in amounts insufficient to eliminate the tendency to wrinkle, thus controlling at the same time the character of wrinkle produced and the color and opacity of the film.

The above descriptions and examples are to be construed as illustrative only. Any variations therefrom which come within the spirit of the invention are considered to be within the scope of the appended claims.

I claim:

1. A coating composition comprising a pigment and a synthetic drying oil, which is a liquid non-volatile polymer of an unsaturated non-benzenoid hydrocarbon having at least two unsaturated bonds, said pigment being present in such quantity that a dried film of the oil is highly adherent to the base to which it is applied when subjected to sudden temperature changes combined with bending, abrasion and like stresses.

2. A coating composition comprising a liquid non-volatile polymer of divinylacetylene and an amount of pigment sufficient to substantially increase the adherence of a film of the dried oil to the base to which it is applied.

3. A coating composition comprising a drying oil, which is a non-benzenoid polymer of acetylene and a "fortifying" pigment, the weight of the synthetic drying oil being substantially equal to the weight of the pigment, multiplied by the oil absorption index for the oil and pigment.

4. A coating composition comprising a drying oil, which is a non-benzenoid polymer of acetylene, and a "fortifying" pigment of the class consisting of graphite, whiting, asbestos, china clay, slate, lithopone, silica, barytes, titanium dioxide, and the basic chromates of lead and zinc.

5. A highly adherent coating composition obtained by grinding in a ball mill in the absence of oxygen, 135 parts of iron oxide, 163 parts of whiting, 93 parts of barytes, 5 parts of carbon black and 80 parts of solvent naphtha, together with 116 parts of and 85% solution in xylene of a liquid non-volatile polymer of divinylacetylene.

6. As a new article of manufacture a base carrying a film of pigmented synthetic drying oil, which is a non-benzenoid acetylene polymer, said film being highly adherent to said base (as compared to the unpigmented oil) when subjected to sudden temperature changes combined with bending, abrasion and like stresses.

7. Sheet metal carrying a tightly adherent coating formed by applying a film of the coating composition recited in claim 2 and drying said film in the presence of air.

8. Sheet metal carrying a tightly adherent coating formed by applying a film of the coating composition recited in claim 3 and drying said film in the presence of air.

9. The process of coating an article of manufacture which comprises applying thereto a decorative coating composition obtained by grinding in a ball mill in the absence of oxygen, 177 parts of bone black, 46 parts of chrome green, and 13 parts of chrome orange with 200 parts of toluene and 740 parts of a 98% solution of a liquid non-volatile polymer of divinylacetylene and thinning the ground mixture by the addition of 426 parts of toluene and 100 parts of a solution in mineral spirits of mixed lead and manganese driers.

10. The process of coating an article of manufacture which comprises applying to a surface thereof an undercoat of the composition recited in claim 2 and an overcoat of a coating composition comprising a liquid non-volatile polymer of divinylacetylene and a pigment, the proportion of pigment to drying oil in said overcoat being insufficient to materially diminish the gloss but sufficient to decrease the tendency of the film to wrinkle on drying.

ARNOLD MILLER COLLINS.